S. Jackson,
Cider Mill.
Nº 7,022.        Patented Jan. 15, 1850.
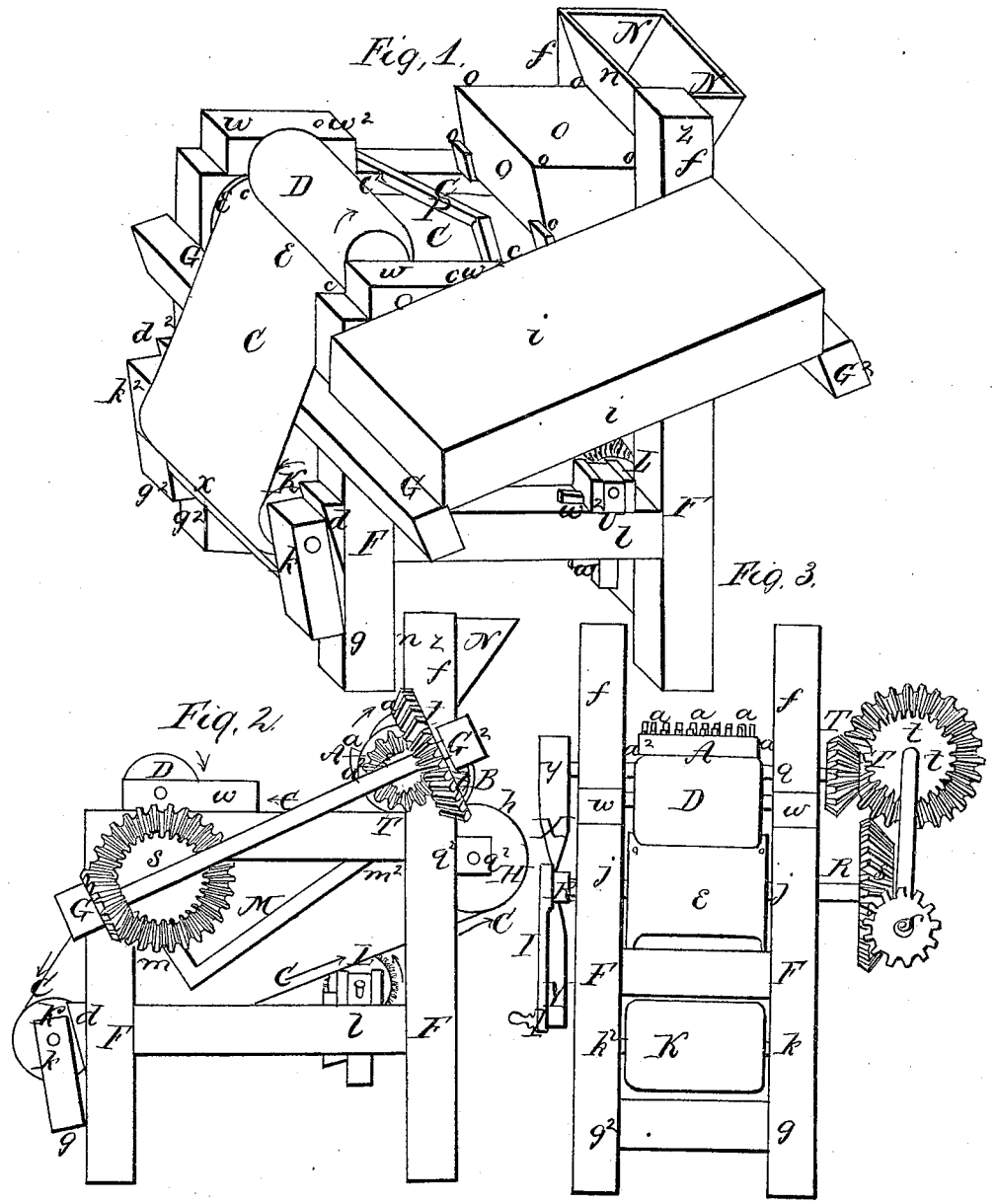

UNITED STATES PATENT OFFICE.

SAMUEL JACKSON, OF HAMILTON, OHIO.

CIDER-MILL.

Specification of Letters Patent No. 7,022, dated January 15, 1850.

*To all whom it may concern:*

Be it known that I, SAMUEL JACKSON, of the city of Hamilton, in the county of Butler and State of Ohio, have invented a new and useful Machine for Grinding and Pressing all Kinds of Fruits and Plants of a Juicy Nature, called "Rotary Cider, Wine, and Juice Expresser"; and I do hereby declare that the following is a full, clear, and exact description of the construction and operation of the same, reference being had to the annexed drawings, making a part of this specification, in which—

Figure 1 is a perspective view, Fig. 2 a longitudinal elevation, and Fig. 3 a transverse section.

To enable others skilled in the art to make and use my invention I will proceed to describe its construction and operation.

I construct an ordinary cutter cylinder, A, Figs. 2 and 3, being a common iron or wooden drum, of diameter and length to suit the different sized machines, say for explanation one foot long and six inches in diameter. In cylinder, A, are iron teeth, $a$, on its outer circumference fastened there by screws, or pins $a^2$, on their inner ends. Said teeth $a$ are, say, 2 inches long, one quarter thick, and 1½ broad. There are four rows of these teeth $a$, 15 in each row, set obliquely to the axes of cylinder A, in a helix nearly one fourth of cylinder A's circumference, so that but one tooth in a row passes the teeth, $b$, in the bed mold B at a time. The bed mold B is made of wood, or cast metal. It is a quadrant and is one eight of an inch more in diameter, than the length of the teeth $a$, added to the diameter of cylinder A. There are 2 or 3 rows of teeth, $b$, 14 in each row, in bed mold B, parallel to each other longitudinal, and to bed mold B's imaginary axis. The teeth $b$ are the size and shape of teeth, $a$, and fastened in the same way; or the teeth, $b$, parallel to each other as above, and the same size, may be cast with bed mold B. The bed mold B is screwed fast to the frame F, Fig. 2, by means of bolts passing through the frame and plates on each end of bed mold B. The felting strap C is one inch below the point of the teeth $a$, Fig. 2, and receives the pomice of the ground fruit at the bottom of the bed mold B. The strap C, and the pomice on it is revolved along (the juice seeping through strap C and falling onto trough M) to the press wheel or drum D and is there pressed, Figs. 1 and 3. The drum D is 17 inches long, and about a foot in diameter, and straight, except the ends which for about an inch are rounded off, as per Fig. 3, in a sextant or quadrant. The counter press wheel E, Fig. 3, is 14 inches in diameter and 18 inches long, and so turned out in the center as to form a spool with collars $e$ one inch high. Said spool E exactly fits drum D (see Fig. 3). Drums D and E are best made of wood.

H is a wooden drum of the same size and shape of drum E. When the felting C is stretched on them, the drums E and H, the sides $c$, Fig. 1, are turned up and form a trough to hold the pomice.

The drum K is 18 inches long, and 12 in diameter, and the same shape of drum D, and is moved by the friction of the strap C. Drum K is used to stretch straps C, and to allow the trough M to pass entirely under drum E and catch the juice which runs through the felting strap C and that which is pressed through at D. The axles of drum K are inserted into two timbers $k$, $k^2$, about one foot above $g$, $g^2$, where they are fastened to the timbers F by hinges, allowing the drum K to swing off from the frame F. The strap C is made long enough to let said axles swing 3 or 4 inches from the frame F before said strap is stretched, and is made and kept tight by two wooden wedges $d$, $d^2$, run down between timbers $k$, $k^2$, and F. Thus is the strap C loosened and stretched.

At the point $l$, on the timbers E, is placed the brush L, Figs. 1 and 2, 18 inches long, and 4 in diameter. Its speed is about ten times as great as the drums D and E, which drums I may run at equal speed by spur gearing on their shafts inside of bevel wheel, Fig. 3. It is driven by means of a strap X which is crossed, and two pulleys $y$, Y, Fig. 3, one, Y, being on the brush's shaft, and the other, the driving pulley $y$, on the cutter wheel shaft A. The brush may be driven by bevel gearing. This brush L removes the fine pomice from the felting which is not removed by the stationary rubber $x$ Fig. 1, at the bottom of the drum K.

The trough M is formed by joining an inch board, 18 inches wide and 10 long, to another inch board, 18 inches wide 36 long, at an angle of ninety degrees, and putting a quarter inch board, two inches wide, on both the edges. The trough thus formed, (see Fig. 2) is suspended with its end, $m$, passing under drum E nearly to strap C, and its end $m^2$ passing 5 or 6 inches under and beyond the bottom of the bed mold B, and within an inch of the strap C. Said trough is suspended in this position by wire hooks fastened to the frame timbers above said trough. Said trough has a spout for the juice to pass out at.

N is a common hopper (see Fig. 1) with a slide gate, $n$, over the cutter wheel A to regulate the feed. Said hopper is the full width of the frame in the clear at the top of its frame support posts, $f$, and is screwed fast to them at $z$. The cutter drum A is covered over, from the slide gate $n$, to within 1½ inches of the strap, C, by a covering O. There are pieces at each end of cutter wheel A, which go up to the hopper N, and are screwed to the frame. In these pieces are grooves, $o$, down which grooves the covering, O, slides. By grooves, $o$, said covering is kept to its place, and taken off.

To equalize the pomice on the strap, a board P three inches high, shaped like a letter V is placed horizontally, the angular point toward the drum A, Fig. 1; said V to be one half inch or more above strap C, just high enough to equalize the pomice over said strap C. This V is fastened permanently or movably to the frame F.

The frame F is constructed 18½ inches wide in the clear, four feet long, and three feet high, of three by four-inch timber, with two side pieces on each side framed, as in Fig. 2, about nine, and thirty two inches from the top, and two end pieces on each end, as in Fig. 3, about three, and twenty one inches from the bottom. The two posts $f$ extend above the main frame F five inches, and the cutter drum A is so set to said posts, by blocks, $q$, that the teeth, $a$, just reach level to the top of the frame F. On the outside of frame F, at, $q^2$, are the journals of drum H so set that they are six inches from bed mold B, and the collars, $h$, of drum H just level with the bottoms of the teeth $a$, making the distance between the strap C and said teeth, $a$, one inch. The journals, $j$, $j$, of drum E, which are on the main shaft R, are placed six inches below the top of frame F (see Figs. 1 and 2). The four bevel wheels $t$, T, $s$, S, so gear the cutter drum A to the main shaft R, that said drum, A, runs five or six times the speed of drum E, and in the opposite direction. The shaft of bevel wheels S, $t$, is supported by the timbers G, $G^2$, Figs. 1 and 3, screwed to the frame F. The bevel wheels $t$ T, $s$, S, are boxed over. Said box is supported on timbers G, $G^2$, Fig. 1. As the brush L wears away, or drum K shifts strap C, said brush, L, should be raised, or lowered, by means of wedges $u$, Fig. 1, passing through the prolonged tenons of the blocks U, and by wedges, $U^2$, passing through blocks U, so as to touch strap C. The axles of the press drum, D, are placed in timbers, W, 18 inches long, six inches from where timbers, W, are fastened by hinges to the upright-frame-posts. The other ends of said timbers, W, are governed by a bolt $W^2$, or by a spring, making said timbers fixed or movable at pleasure. Thus is the quantity of pressure regulated. The axles of brush L pass through blocks U. In small machines a crank I, is used to drive them; large ones are driven by horse, or steam power. I do not confine myself to the sizes here mentioned. On a machine of the size here specified one man, with the aid of a boy, can make, turning the machine by hand, about fifteen barrels of cider in ten hours.

The superiority of this machine consists not less in saving time and labor than in grinding the smallest quantity of fruit, commonly lost. When the grinding is done the pressing is also nearly finished, and the juice, being trained through C, is pure.

What I claim as my invention, and desire to secure by Letters Patent, is—

The particular combination of machinery used for the purpose of grinding and pressing fruits, and juicy substances, viz: first, the cutter drum, A, with its teeth, $a$, Fig. 2, running into teeth, $b$, in bed mold, B, used to grind the fruit, or juicy substance; second, the strap C, Fig. 1, made of felting, hair cloth, or other porous fabric, used to carry the pomice, or ground substance between the pressing drums D and E, where it is pressed, and to strain the juice thus expressed; third, the press drums D and E used to press the juice from the pomice, or ground substance; fourth, the brush L, used to remove the pomice, or ground substance from the strap C, Figs. 1 and 2, all of the above being performed by one application of power and continued rotary motion.

SAMUEL JACKSON.

Witnesses:
WM. KEY BOND,
H. OPPENHEIMER.